(12) United States Patent
Vyas et al.

(10) Patent No.: US 9,878,907 B2
(45) Date of Patent: Jan. 30, 2018

(54) SYSTEM AND METHOD TO PRODUCE HYDROGEN

(71) Applicant: Cavendish Energy, Chicago, IL (US)

(72) Inventors: Ujjval Vyas, Chicago, IL (US); John Kriegshauser, Chicago, IL (US); Alan Bath, Chicago, IL (US); Regis Luther, Naperville, IL (US)

(73) Assignee: CAVENDISH ENERGY, Fort Worth, TX (US)

( * ) Notice: Subject to any disclaimer, the term of this patent is extended or adjusted under 35 U.S.C. 154(b) by 0 days.

(21) Appl. No.: 14/881,130

(22) Filed: Oct. 12, 2015

(65) Prior Publication Data

US 2017/0101311 A1    Apr. 13, 2017

(51) Int. Cl.
*B01J 19/24* (2006.01)
*C01B 3/08* (2006.01)

(52) U.S. Cl.
CPC ............. *C01B 3/08* (2013.01); *B01J 19/24* (2013.01); *B01J 2219/00049* (2013.01); *B01J 2219/24* (2013.01)

(58) Field of Classification Search
CPC .... B01J 2208/00814; B01J 2208/00893; B01J 2219/00049; B01J 2219/24; B01J 19/24; H01M 8/22; C01B 3/00; C01B 2203/169; C01B 2203/0495; C01B 3/08; C09K 8/035; C09K 8/12; C09K 8/584; C09K 8/68; C09K 8/685; C09K 8/80; C09K 8/805; C09K 8/887; C09K 17/14; C09K 17/40; C09K 2208/26; C09K 3/18; C09K 3/22; C09K 8/588; C09K 8/602; C09K 8/62; C09K 8/64; C09K 8/82
See application file for complete search history.

(56) References Cited

U.S. PATENT DOCUMENTS

| 2,721,789 | A | * | 10/1955 | Gill | C01B 3/061 422/117 |
| 3,895,102 | A | * | 7/1975 | Gallagher | C01B 3/061 252/188.25 |
| 8,864,857 | B1 | * | 10/2014 | Mayne | C01B 3/065 423/294 |

(Continued)

FOREIGN PATENT DOCUMENTS

WO    WO 0208118 A1 *  1/2002    ............... B01J 7/02

OTHER PUBLICATIONS

International Search Report for related Application No. PCT/US16/56627; report dated Jan. 10, 2017.

*Primary Examiner* — Anthony J Zimmer
*Assistant Examiner* — Syed Iqbal
(74) *Attorney, Agent, or Firm* — Miller, Matthias & Hull LLP

(57) ABSTRACT

The present disclosure is directed to a hydrogen production system for creating and extracting hydrogen gas. The hydrogen production system contains a reactor vessel into which a solution and a metallic or semi-metal material may be placed. The solution is added to the reactor vessel contains both water and a caustic. When contacting the metallic or semi-metal material within the reactor vessel a chemical reaction occurs. The chemical reaction creates hydrogen gas as well as heat and other byproducts. The hydrogen gas may then flow through a hydrogen extraction point located on the reactor vessel for collection or operational use.

12 Claims, 11 Drawing Sheets

(56) References Cited

U.S. PATENT DOCUMENTS

| | | |
|---|---|---|
| 2003/0033991 A1 | 2/2003 | Cheng |
| 2003/0143155 A1 | 7/2003 | Andersen et al. |
| 2005/0042165 A1* | 2/2005 | Akiyama .............. C01B 3/0005 423/648.1 |
| 2009/0010837 A1 | 1/2009 | Yabe et al. |
| 2010/0061923 A1 | 3/2010 | Reddy |
| 2013/0039846 A1 | 2/2013 | Fukai |
| 2014/0271449 A1* | 9/2014 | McAlister ................ C01B 3/10 423/658 |

* cited by examiner

| Hydrogen Production System Variable | Range of Operation Constraints (890) |
|---|---|
| 810 Surface Area | Unbounded |
| 830 Temperature | 10° – 200° Celsius |
| 850 Molarity (Caustic Concentration) | 0.1 M – 8 M |
| 870 Solubility (Moles of the Caustic / Moles of the Metallic or Semi-Metal Material) | Greater than 1 |

SYSTEM AND METHOD TO PRODUCE HYDROGEN

FIELD OF DISCLOSURE

The present disclosure relates to a system and method for the production of hydrogen gas, and more particularly to an enclosed reaction system that produces hydrogen gas.

BACKGROUND OF THE DISCLOSURE

Hydrogen gas is by far the most plentiful element in the universe, having the lowest atomic number of all other elements. Though plentiful in general, hydrogen is not plentiful on earth in an easily-used state. The majority of hydrogen on earth is chemically bonded to oxygen in water. Moreover, most hydrogen that is not bound in water is chemically bound in other more complex forms such as hydrocarbons. Considering water, it is possible to break the bond between hydrogen and oxygen to obtain hydrogen in its elemental foam (H+) or a diatomic form ($H_2$). In this document, both forms will be generally referred to as the elemental form for hydrogen.

The ability to obtain elemental hydrogen is critical to many industries. In the chemical industry, hydrogen is frequently used to produce ammonia through the Haber process for use in agricultural fertilizer. Hydrogen is also used in the production of plastics and pharmaceuticals, and is an important element in many oil-refining processes. In the food industry, hydrogen can form hydrogenated oils from fats for uses in butter substitutes like margarine, thus delaying spoilage. In the electronics industry, hydrogen provides an excellent flushing gas during the manufacture of silicon chips.

Of greater current interest, hydrogen has been described as the fuel of the future and this is a reasonably accurate description. Hydrogen can be used as feedstock to hydrogen fuel cells, which produce electricity while producing only clean water as a byproduct. Similarly, the combustion of hydrogen in an internal combustion engine leaves only water as a byproduct.

The foregoing are but a small sampling of the uses to which elemental hydrogen may be put. Nonetheless, it remains a challenge to produce hydrogen in a clean and cost-effective manner. Known methods for producing hydrogen gas include steam reformation—using a hydrocarbon feed stock such as methane—and electrolysis, which uses electricity to break the hydrogen-oxygen bond.

Steam reformation is currently the predominant method of hydrogen production, and involves reacting steam ($H_2O$) with methane ($CH_4$) in an endothermic reaction to yield syngas, a fuel gas mixture consisting primarily of hydrogen, carbon monoxide, and some carbon dioxide. Electrolysis, which is the secondary means for producing hydrogen, involves applying an electric voltage in water. The voltage disassociates the hydrogen and oxygen to produce gaseous hydrogen.

As noted above, these current methods of hydrogen production are not energy efficient or cost effective, and in some cases also result in contaminants. A cleaner, more cost effective and energy efficient means for producing hydrogen gas would be beneficial. And while the present disclosure is directed to a system that can eliminate some of the shortcomings noted in this Background section, it should be appreciated that any such benefit is not a limitation on the scope of the disclosed principles, or of the attached claims, except to the extent expressly noted in the claims. Additionally, the discussion of technology in this Background section is reflective of the inventors' own observations, considerations, and thoughts, and is in no way intended to accurately catalog or comprehensively summarize the prior art. As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

SUMMARY OF THE DISCLOSURE

In one aspect of the disclosure, a hydrogen production system is disclosed. The hydrogen production system has a reactor vessel which may have an interior chamber. The reactor vessel may then have a hydrogen extraction point in fluid communication with the interior chamber. A solution may be present filling at least a portion of the interior chamber of the reactor vessel. The solution contains at least a predetermined amount of caustic in water such that the predetermined amount of caustic dissolves within the water. Also, a metallic or semi-metal material is present. The metallic or semi-metal material consists essentially of a predetermined amount of metallic or semi-metal material. The metallic or semi-metal material is at least partially within the interior chamber of the reactor vessel and in contact with the solution. The surface of the metallic or semi-metal material is exposed to the solution producing hydrogen gas.

In another aspect of the disclosure, a method to produce hydrogen gas is disclosed. First, at least a portion of a reactor vessel is filled with a solution. The solution contains a caustic dissolved into water. Then a metallic or semi-metal material is added to the reactor vessel. The amount of metallic or semi-metal material being selected such that the reaction of the metallic or semi-metal material and the solution will react to produce hydrogen gas without saturating the solution with a byproduct of the hydrogen-producing reaction. Next, the metallic or semi-metal material is allowed to come into contact with the solution to initiate the hydrogen-producing reaction. Finally, at least a portion of the hydrogen gas is collected.

In yet another aspect of the disclosure, a hydrogen production system is disclosed. The hydrogen production system includes a reactor vessel containing a metallic or semi-metal material and a solution of a caustic dissolved in a solvent. The molecular ratio of the caustic to the metallic or semi-metal material is selected such that the entirety of the metallic of semi-metal material will react in the solution to generate hydrogen gas and a soluble hydroxide. The soluble hydroxide will not over saturate the solution.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

FIG. 10 is a table of a range of operation constraints for each the surface area variable, temperature variable, molarity variable, and solubility variable used in the operation of the hydrogen production system in accordance with an embodiment of the disclosed principles.

DETAILED DESCRIPTION OF THE EMBODIMENTS

Before presenting a detailed discussion of embodiments of the disclosed principles, an overview of certain embodiments is given to aid the reader in understanding the later discussion.

Figure 1:
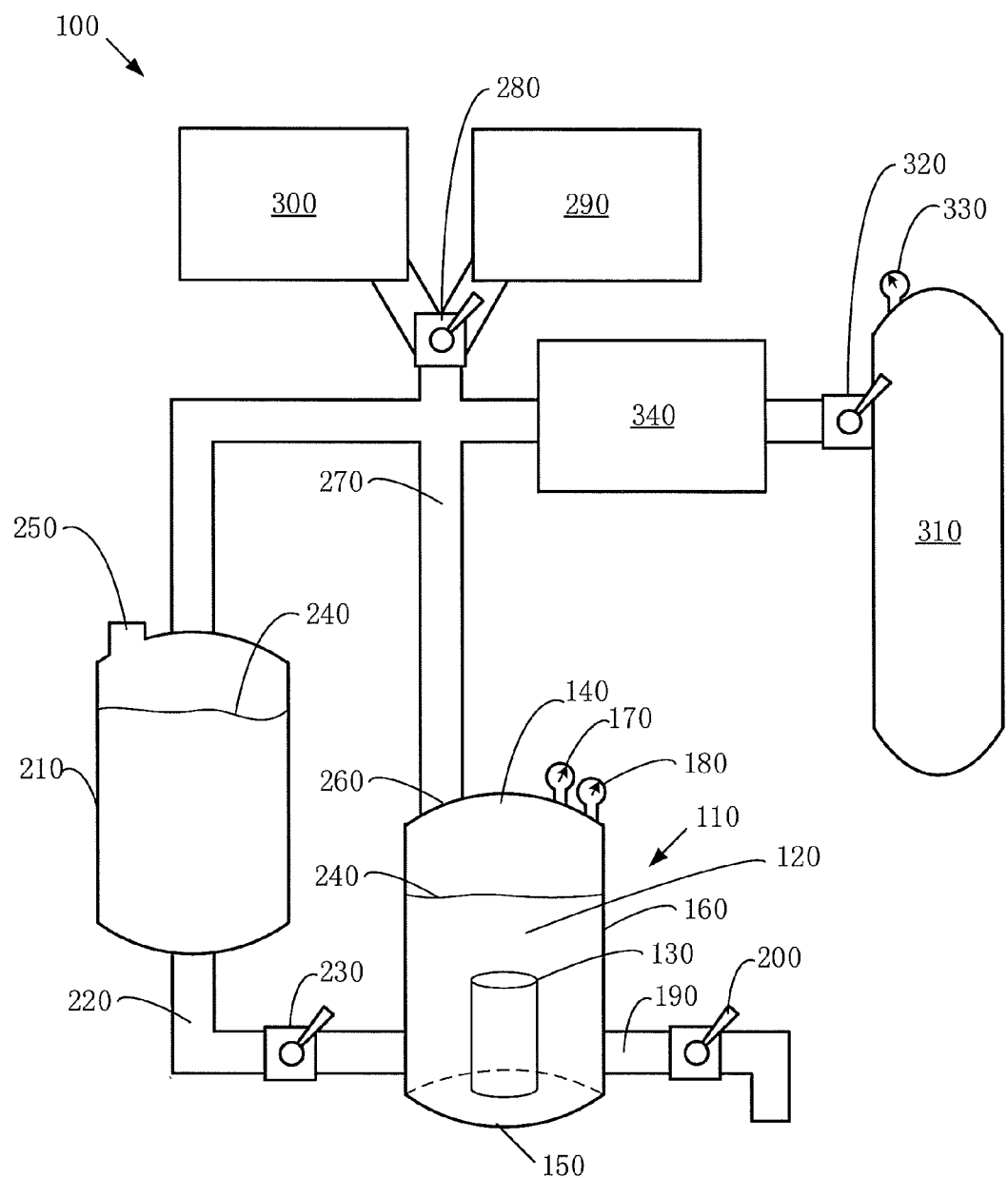
FIG. 1 is plain view of core components of the hydrogen production system 100 in accordance with an embodiment of the disclosed principles.

FIG. 1 is a depicted representation of the core of the hydrogen production system 100. At the core of the hydrogen production system 100 a reactor vessel 110 is needed. The reactor vessel 110 may be any type of container which is suitable to contain a chemical reaction. The shape and size of the reactor vessel 110 can be adjusted and manipulated for the exact application and environment needed for the hydrogen. The reactor vessel 110 may be made of a sturdy material, such as but not limited to a metallic alloy, which can contain both a solution 120 and a metallic or semi-metal material 130 inside the reactor vessel 110. The reactor vessel 110 may also be constructed in such a way that pressure contained from a chemical reaction will not affect the structural integrity of the reactor vessel 110. Also, the material which is used to create the reactor vessel 110 may have a chemical composition and alignment to contain the byproducts of the chemical reaction so that the byproducts cannot seep into the material of the reactor vessel 110 or deteriorate the structural integrity of the reactor vessel 110.

The reactor vessel 110 has at least a top portion 140 and a bottom portion 150 in an embodiment, and takes any of a multitude of cross-sectional shapes including but not limited to a cylinder, square, rectangle, or triangle. The reactor vessel 110 may also have an interior chamber which may hold the components of a chemical reaction. The bottom portion 150 of the reactor vessel 110 is attached to the sides 160 of the reactor vessel 110. The top portion 140 of the reactor vessel 110 may be either part of the formed reactor vessel 110 or, in an alternate embodiment, fashioned from a covering device (not shown). The covering device (not shown) may be a lid, cap, canopy or seal or the like placed over the top portion 140 of the reactor vessel 110 and attached to the sides 160 of the reactor vessel 110. The covering device (not shown) can be removed or have an opening(s) to place within the reactor vessel 110 the components of the chemical reaction sought. Fastening devices (not shown) such as but not limited to clips and clamps may be positioned on the sides 160 of the reactor vessel 110 to hold the covering device (not shown) on the top portion 140 of the reactor vessel 110. If however the top portion 140 of the reactor vessel 110 is formed as part of the reactor vessel 110, a feeding mechanism or actuator (not shown) may be employed to allow the chemical materials to enter the reactor vessel 110.

A solution 120 is placed inside the reactor vessel 110 in an embodiment of the disclosed principles. This solution 120 includes water ($H_2O$) as well as a caustic. The caustic is any of a variety of caustic substances, and is introduced into the solution 120 in either a liquid or solid form. If introduced in a solid form, the caustic has the ability to dissolve into the water as to adequately disperse the caustic throughout the solution 120. The caustic producing the best results within the hydrogen production system 100 is sodium hydroxide (NaOH), however a variety of other caustics which react with any of the below described metallic or semi-metal material 130 may be used. The solution 120 which is placed inside the reactor vessel 110 fills at least part of the interior chamber of the reactor vessel 110.

Additionally, a metallic or semi-metal material 130 is placed inside the interior chamber of the reactor vessel 110. The metallic or semi-metal material 130 is placed inside the reactor vessel 110 in such a fashion so that the solution 120 adequately contacts the metallic or semi-metal material 130. The metallic or semi-metal material 130 is a material which chemically reacts with the solution 120 to produce at least hydrogen gas as a byproduct. Examples of such metallic or semi-metal materials 130 include but are not limited to aluminum, ferrosilicon, copper, iron, magnesium, and zinc. When using the caustic of sodium hydroxide (NaOH), the best results were found using aluminum (Al) as the metallic or semi-metal material 130 for the hydrogen production system 100. The details and models of the chemical reaction occurring within the reactor vessel 110 will be disclosed in greater detail below.

On the top portion 140 of the reactor vessel 110, or on the covering device (not shown), there may be a temperature gauge 170. When the solution 120 and metallic or semi-metal material 130 react within the reactor vessel 110, one of the chemical reaction byproducts produced is heat causing an increase in temperature. In an effort to stabilize and maintain the chemical reaction between the solution 120 and the metallic or semi-metal material 130, a temperature gauge 170 is present which measures the temperature of the solution 120 within the reactor vessel 110. The temperature gauge 170 reports to the user of the hydrogen production system 100 the operating temperature of the chemical reaction taking place. Reporting the temperature in such a manner alerts the user to increases and decreases in temperature and the ability to react accordingly if cooling or heating of the reactor vessel 110 is needed.

Also included on either the top portion 140 of the reactor vessel 110 or on the covering device (not shown) is a pressure gauge 180. Like an increase in temperature, an increase in pressure occurs when the chemical reaction takes place within the reactor vessel 110. As the chemical reaction creates a product of hydrogen gas, that hydrogen gas increases the pressure within the reactor vessel 110. The pressure gauge 180 reports to the user of the hydrogen production system 100 the pressure within the reactor vessel 110. This allows the user the opportunity to know when to release hydrogen from the reactor vessel 110, thereby lowering the pressure for proper operation of the hydrogen production system 100.

At the bottom of the reactor vessel 110 a drainage output 190 may be present. The drainage output 190 on the reactor vessel 110 allows the solution 120 within the reactor vessel 110 to be removed from the reactor vessel 110. The drainage output 190 may connect to a drain valve 200. The drain value is a regular value having and open and closed position. When the drain valve 200 is placed in an open position, the solution 120 flowing from the reactor vessel 110 through the drainage output 190 will then flow through the drain valve 200 and into either another outside system or storage container effectively removing the solution 120 from the reactor vessel 110. If the drain valve 200 is placed in the closed position, the drain valve 200 blocks the flow of the solution 120 within the reactor vessel 110 so that none of the solution 120 may leave the reactor vessel 110.

The drain valve 200 and drainage output 190 have two distinct functions within the hydrogen production system 100. The drain valve 200 and the drainage output 190 allow for the emergency evacuation of the solution 120 from the reactor vessel 110 if the temperature or pressure reaches a critical or uncontrollable level. Additionally, the drainage output 190 and drain valve 200 may be connected to other outside systems such as a filter 530 (not shown), or a storage tank (not shown) to either store or filter 530 the solution 120 for later use or recycling of byproducts produced by the chemical reaction.

Still referring to FIG. 1, a reservoir vessel 210 is disposed remotely from the reactor vessel 110. The reservoir vessel 210 is connected to the reactor vessel 110 by a fluid passage 220 to allow for the solution 120 to freely flow between the two vessels. The fluid passage 220 may be made with a tube, or another linking agent which sufficiently connects the two vessels while adequately protecting and not inhibiting the flow of the solution 120 between the two vessels. The fluid passage 220 connects to the bottom of the reservoir vessel 210 and to the lower part of the side portion 160 of the reactor vessel 110. Located on the fluid passage 220 is a fluid valve 230. The fluid valve 230 is a regular value having and open and closed position and allows for the flow of fluid between the two vessels. When the fluid valve 230 is placed in an open position, the solution 120 flowing from the reservoir vessel 210 through the fluid passage 220 will then flow into the reactor vessel 110. If the fluid valve 230 is placed in the closed position, the fluid valve 230 blocks the flow of the solution 120 from the reservoir vessel 210 to the reactor vessel 110.

The solution 120 may travel through the fluid passage 220 from the reservoir vessel 210 to the reactor vessel 110 either based on gravity or Bernoulli's principle of fluid dynamics This flow adds the solution 120 to the reactor vessel 110. If the solution level 240 of both the reactor vessel 110 and the reservoir vessel 210 are not level with one another, the volume of the solution 120 in each vessel can be adjusted accordingly so that they are equal.

The reservoir vessel 210 may also have a reservoir opening 250 of some sort on the top portion of the reservoir vessel 210. This reservoir opening 250 facilitates the addition of solution 120 to the reservoir vessel 210. This reservoir opening 250 can also be used to add either water or the caustic to the solution 120 depending on the needs of the user operating the hydrogen production system 100. The reservoir opening 250 may have a covering (not shown) such as but not limited to a cap, lid, or seal that can be removed to allow the addition of material or secured to the top portion of the reservoir opening 250 to form a seal.

Referring back to the reactor vessel 110 as seen in FIG. 1, there may be a hydrogen extraction point 260 located in the top portion 140 of the reactor vessel 110 or the covering device (not shown). The hydrogen extraction point 260 is fashioned either into the covering device (not shown) placed over top portion 140 of the reactor vessel 110 or into the top portion 140 of the reactor vessel 110 itself. Additionally, the hydrogen extraction point 260 is, in an alternate embodiment, fashioned into the upper sides of the reactor vessel 110. The hydrogen extraction point 260 is operable to allow hydrogen gas to pass through the hydrogen extraction point 260. As hydrogen gas is a product of the chemical reaction occurring within the reactor vessel 110, the hydrogen gas must have a means of leaving the reactor vessel 110 for collection and use.

A multitude of devices may attach to the hydrogen extraction point 260. One such device is a hydrogen flow path 270 in which the hydrogen gas is led away from the reactor vessel 110. The hydrogen flow path 270 may be constructed with a tube, or another linking agent which sufficiently protects the flow of hydrogen and does not inhibit the flow of hydrogen to outside linked sources.

As the hydrogen flow path 270 leaves the reactor vessel 110, the hydrogen flow path 270 may connect to the top portion of the reservoir vessel 210. This connection of the hydrogen flow path 270 between the reactor vessel 110 and the reservoir vessel 210 allows for the equalization of pressure between the two vessels. As pressure builds by the chemical reaction within the reactor vessel 110, the hydrogen leaves the reactor vessel 110 through the hydrogen extraction point 260 and flows through the hydrogen flow path 270 and into the reservoir vessel 210. This flow equalizes the pressure between the two vessels. This allows the solution 120 to flow through the fluid passage 220 to operate on Bernoulli's principle adding additional solution 120 to the reactor vessel 110 if needed.

Also attached to the hydrogen flow path 270 may be a purge valve 280. The purge valve 280 exists to remove unwanted contaminants or ambient air from the hydrogen production system 100. When the hydrogen production system 100 is assembled, ambient air, including any contaminants, fills the free space above the solution 120 in each the reactor vessel 110 and the reservoir vessel 210. As the chemical reaction occurs in the reactor vessel 110, hydrogen is produced to add pressure to the hydrogen production system 100. The purge value is a regular value having and open and closed position. When the purge valve 280 is placed in an open position, the ambient air and hydrogen within each the reactor vessel 110 and the reservoir vessel is removed from the hydrogen production system 100 as the pressure build up releases this ambient air and hydrogen through the purge valve 280 and into the atmosphere 290. If the purge valve 280 is placed in the closed position, the purge valve 280 closes the hydrogen flow path 270 allowing the pressure within the hydrogen production system 100 to build based on the chemical reaction occurring in the reactor vessel 110.

Unlike the above descripted purge of the hydrogen production system 100 into the atmosphere 290, the purge valve 280 may also connect to a vacuum pump 300. The vacuum pump 300 operates to remove the ambient air from the hydrogen production system 100. When the purge valve 280 is placed in an open position, the vacuum pump 300 operates to suck out and remove the ambient air from the hydrogen flow path 270 as well as both the reservoir vessel 210 and the reactor vessel 110.

The removal of the ambient air from these components creates a clean vacuum space which can later be filled with hydrogen gas when the chemical reaction occurs. If the purge valve 280 is placed in the closed position, the purge valve 280 blocks access to the vacuum pump 300 and closes the hydrogen flow path 270 allowing the pressure within the hydrogen production system 100 to build based on the chemical reaction occurring in the reactor vessel 110.

The hydrogen flow path 270 may also connect to a multitude of additional components dependent on the user's intended use of the hydrogen gas. Commonly, the hydrogen flow path 270 will end with a connection to a containment vessel 310. The containment vessel 310 may be any vessel acceptable and configured for the storage of hydrogen gas. The containment vessel 310 may take on any of a multitude of cross-sectional shapes including but not limited to a cylinder, square, rectangle, or triangle. The hydrogen produced by the chemical reaction within the reactor vessel 110 would then flow through the hydrogen flow path 270 and become stored within the containment vessel 310.

A hydrogen flow valve 320 may be employed at the point the hydrogen flow path 270 connects to the containment vessel 310. In an open position, the hydrogen flow valve 320 would allow hydrogen to flow into the containment vessel 310. However, in a closed position, the hydrogen flow valve 320 would close the hydrogen flow path 270 effectively sealing the hydrogen gas within the containment vessel 310.

A hydrogen pressure gauge 330 may also be attached to the containment vessel 310. The hydrogen pressure gauge 330 can adequately determine the pressure of the hydrogen within the containment vessel 310. When an acceptable pressure, based on the user's wishes, has been reached within the containment vessel 310, the user may turn the hydrogen flow valve 320 to the closed position to store the hydrogen within the containment vessel 310. The containment vessel 310 could then be removed from the hydrogen production system 100 and transported or stored for later use.

Additionally, the hydrogen flow path 270 may connect to a desiccator 340 before continuing on to the containment vessel 310. The chemical reaction, which will be discussed in detail below, consumes water during hydrogen production. Heat is also a byproduct of the chemical reaction. Because the chemical reaction occurring in the reactor vessel 110 consumes the water within the solution 120 as well as heats the solution 120 there is a chance that water may evaporate from its liquid medium and become the gaseous medium of water vapor. This water vapor would travel with the hydrogen gas through the hydrogen extraction point 260 and hydrogen flow path 270 towards the containment vessel 310. Running this mixture of hydrogen gas and water vapor through the desiccator 340 before the containment vessel 310 removes the water vapor from the mixture of hydrogen gas and water vapor. By removing the water vapor in this fashion only pure hydrogen gas enters and is contained within the containment vessel 310.

As stated above the hydrogen flow path 270 can lead to a multitude of specific outputs for the use of hydrogen gas. Some of these outputs, the desiccator 340 and containment vessel 310, are the most common uses for the production and containment of the produced hydrogen gas. The hydrogen flow path 270, in an additional embodiment, may also lead to an incendiary device (not shown) that may produce a flame with the extracted hydrogen gas. Additionally, the hydrogen flow path 270, in another additional embodiment, may lead to a power generation unit (not shown) that uses the extracted hydrogen gas as fuel. Furthermore, the hydrogen flow path 270, in yet another additional embodiment, may lead to an airship device (not shown) that uses the hydrogen gas for lift and buoyance. The outputs of the hydrogen flow path 270 are endless depending on the personal wishes of the user employing the hydrogen production system 100. The above examples are illustrative at best and are not to be considered as the full range of exemplary situations where the hydrogen flow path 270 may conclude.

Figure 2:
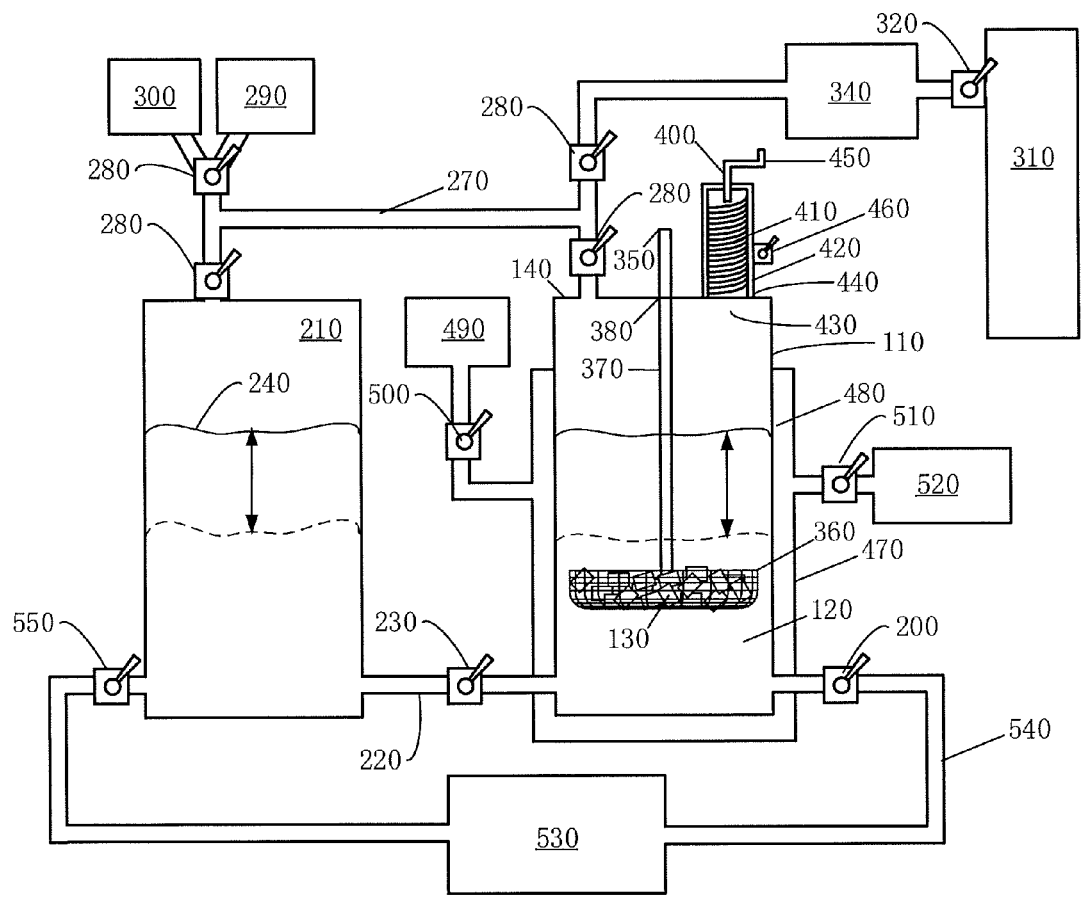
FIG. 2 is a more detailed plain view of the hydrogen production system 100 of FIG. 1, in accordance with an embodiment of the disclosed principles.

Turning now to FIG. 2, the hydrogen production system 100 is shown in greater detail. The hydrogen production system 100 of FIG. 2 contains the same core elements as FIG. 1 including the reactor vessel 110, reservoir vessel 210, desiccator 340 and containment vessel 310. FIG. 2, however, provides a more detailed view of the relationships and interconnections between these components. The reactor vessel 110 as seen in FIG. 2 is manufactured as a complete enclosure and does not have a covering device on the top portion of the reactor vessel 110. The top portion 140 of the reactor vessel 110 is part of the reactor vessel 110 itself. Inside the interior of the reactor vessel 110 the solution 120 can be seen with the metallic or semi metal material. The metallic or semi metal material is suspended within the interior of the reactor vessel 110 by a lowering device 350.

In the embodiment of FIG. 2, the lowering device 350 is a mesh wire basket 360 which can hold the metallic or semi-metal material 130. The lowering device 350 is manufactured from a non-reactive material to the chemical reaction such as but not limited to stainless steel. A shaft portion 370 of the lowering device 350 protrudes through the top portion of the reactor vessel 110 through a lowering device opening 380. The shaft portion 370 of the lowering device 350 may be configured to raise the lowering device 350 up and down within the reactor vessel 110. By moving the lowering device 350 up and down within the reactor vessel 110, a user of the hydrogen production system 100 can regulate the amount of metallic or semi-metal material 130 that is in contact with the solution 120. Through this action, the chemical reaction occurring within the reactor vessel 110 can be controlled.

On the right top portion for the reactor vessel 110 a feeding mechanism or actuator 390 is present. The feeding mechanism or actuator 390 as presented in the embodiment disclosed within FIG. 2 is a linear actuator such as a crank shaft 400 connected to a removable metallic or semi-metal magazine 410. During operation, the removable metallic or semi-metal magazine 410 may be loaded within the crank shaft compartment 420. The removable metallic or semi-metal magazine 410 may contain chips or pieces of the metallic or semi-metal material 130 to be fed into the reactor vessel 110. The removable metallic or semi-metal magazine 410 has a corkscrew shape. The corkscrew shape allows for the crank shaft 400 to spin the removable metallic or semi-metal magazine 410 and gradually feed the metallic or semi-metal material 130 into the interior of the reactor vessel 110. Once the removable metallic or semi-metal magazine 410 is loaded into the crank shaft compartment 420, the crank shaft compartment 420 is attached to the right top portion 430 of the reactor vessel 110 by a series of crank shaft fasteners 440. This secures the crank shaft compartment 420 to the reactor vessel 110 and provides a suitable seal preventing the release of the hydrogen gas around the edges of the seal. A crank 450 is located and attached at the top portion of the crank shaft 400. The crank 450 may be manual or automatically spun by the user or an operating machine to gradually feed metallic or semi-metal material 130 into the reactor vessel 110. Additionally, located to one side and attached to the crank shaft compartment 420 is a crank shaft valve 460. The crank shaft valve 460 like the other valves described above has both an open and a closed position. When the crank shaft valve 460 is in the open position, air or hydrogen gas may be purged from the interior of the crank shaft compartment 420 and released through the crank shaft valve 460. If the crank shaft valve 460 is in the closed position, a seal is formed preventing the release of hydrogen gas from the hydrogen production system 100 through the crank shaft valve 460.

As seen in FIG. 2, the reactor vessel 110 is placed within a cooling container 470. The cooling container 470 may be a multitude of sizes and shapes depending on the needs of the hydrogen production system 100. The cooling container 470 should be large enough to contain the reactor vessel 110 comfortably as well as provide adequate space for a cooling agent 480 to fill the void between the reactor vessel 110 and the cooling container 470. In an embodiment of the present disclosure, a cooling agent 480 that may be used is water. As stated earlier, a byproduct of the chemical reaction occurring within the reactor vessel 110 is heat. That heat may cause the reaction within the reactor vessel 110 to become unstable and uncontrollable. By using the cooling container 470 filled with the cooling agent 480, the reactor vessel 110 can be adequately cooled by removing the produced heat from the reactor vessel 110.

The cooling agent 480 may be held within a cooling agent storage 490. In an embodiment of the present disclosure, this cooling agent storage 490 may be a tank of water or the like. The cooling agent 480 would then flow through a cooling agent input valve 500 into the interior of the cooling container 470. This flow would adequately fill the cooling container 470 with the cooling agent 480. The cooling agent input valve 500 is a simple open or closed position valve which would control the flow of the cooling agent 480 from the cooling agent storage 490 into the cooling container 470. While the cooling agent 480 is present within the cooling container 470, heat is transferred from the reactor vessel 110 into the cooling agent 480. This in turn heats up the cooling agent 480. If water is used as the cooling agent 480, this process may cause the water to heat to a temperature allowing the water to boil and transform into water vapor. On the opposite end of the cooling container 470 is a cooling agent output valve 510. The cooling agent output valve 510 allows the flow of the cooling agent 480, which has been heated, out of the cooling container 470. When the cooling agent 480 has been heated it is no longer effective as a cooling agent 480. Therefore, it must be removed from the cooling container 470. The cooling agent output valve 510 having a simple open and closed position provides an adequate exit point for the cooling agent 480. The heated cooling agent 480 may then follow a cooling agent flow path 520 to be used in other systems, such as but not limited to heat engines or the driving of a turbine. In other embodiments, the cooling agent 480 may follow a cooling agent flow path 520 to be discarded, recycled, stored, or used in other useful applications.

Above both the reactor vessel 110 and the reservoir vessel 210 the hydrogen flow path 270 can be seen. The hydrogen flow path 270 may have a series of purge valves 280 located along its piping structure. These purge valves 280, as stated earlier, may be used to remove ambient air or hydrogen from the hydrogen production system 100. This removal can be accomplished in two different ways. First the hydrogen flow path 270 may be purged when the hydrogen production system 100 becomes pressurized by releasing the ambient air and hydrogen into the atmosphere 290. Secondly, the hydrogen flow path 270 may be connected to a vacuum pump 300. By opening the proper purge valves 280, the ambient air will be sucked out and removed from the hydrogen production system 100 by the vacuum pump 300.

Below both the reactor vessel 110 and the reservoir vessel 210 is a filter 530. The hydrogen production system 100 of FIG. 2 is designed to be a self-sustaining enclosed system. To accomplish these means, the solution 120 that is part of the chemical reaction within the reactor vessel 110 may need to be cleaned or filtered before returning to the reactor vessel 110. When the chemical reaction takes place within the reactor vessel 110, one byproduct of the chemical reaction is aluminum hydroxide ($Al(OH)_3$). Depending on the variable, factors associated with the chemical reaction, the aluminum hydroxide ($Al(OH)_3$) may either dissolve into the solution 120 or form various types of precipitates depending on overall system conditions. The filter 530 is present to remove the aluminum hydroxide ($Al(OH)_3$) from the solution 120 so that when the solution 120 is reused, the solution 120 can maintain and hold additional aluminum hydroxide ($Al(OH)_3$).

As seen in FIG. 2, a solution flow path 540 connects the reactor vessel 110 to the filter 530 and in turn the reservoir vessel 210. The solution 120 within the reactor vessel 110 which may be rich with aluminum hydroxide ($Al(OH)_3$) can flow into the solution flow path 540 and through the drain valve 200. The drain valve 200 as described above has and on and an off position regulating the flow of the solution 120 through the solution flow path 540. Once the solution 120 has passed the drain valve 200 the solution 120 will enter the filter 530 of the hydrogen production system 100. Within the filter 530, the aluminum hydroxide ($Al(OH)_3$) is removed from the solution 120. Additionally, the filter 530 may provide the additional task of removing other insoluble products from the solution 120. When the metallic or semi-metal material 130 is consumed by the chemical reaction, there is a chance that the metallic or semi-metal material 130 may contain some insoluble products. These insoluble products may remain and settle within the solution 120. When the solution 120 enters the filter 530, the solution 120 will have the aluminum hydroxide ($Al(OH)_3$) removed, but the solution 120 may also have the insoluble products removed as well. From the filter 530, the solution 120 follows the solution flow path 540 back into the reservoir vessel 210. Before entering the reservoir vessel 210, the cleaned solution 120 passes through a reservoir valve 550. The reservoir valve 550 regulates the flow of the clean solution 120 back into the reservoir vessel 210 for subsequent use of the solution 120.

Figure 3:
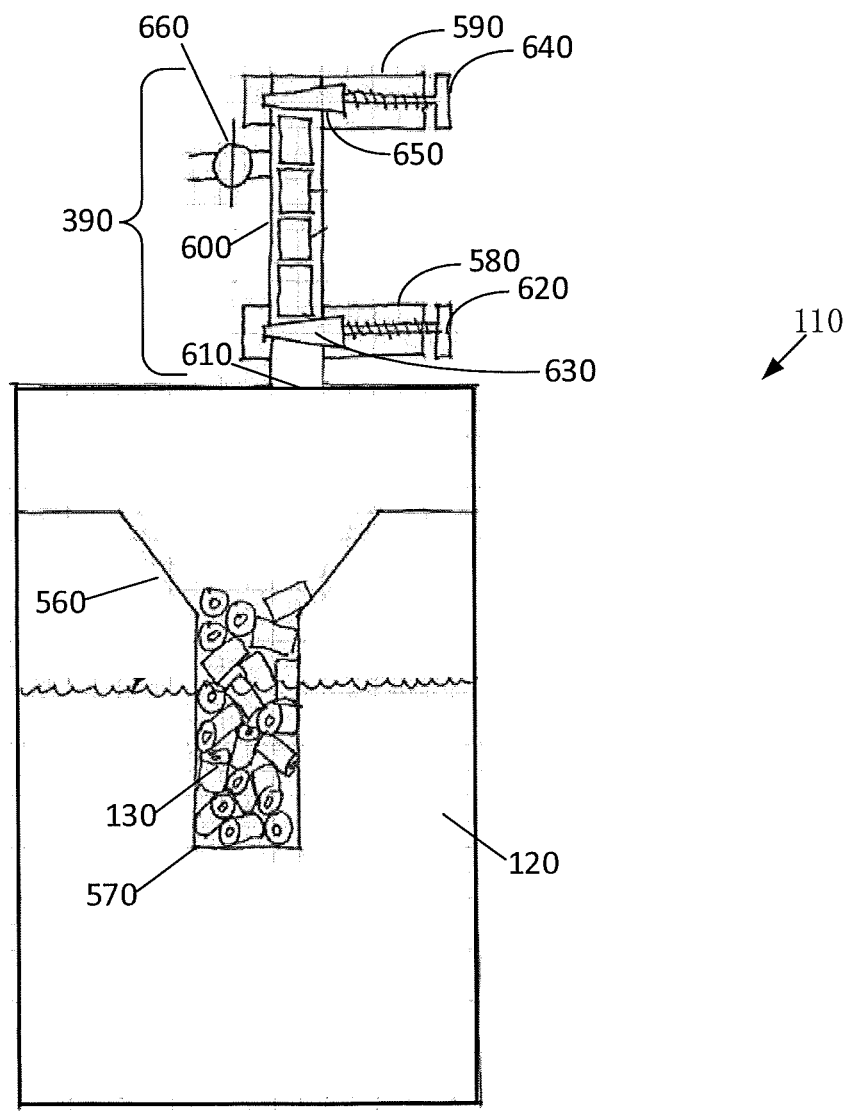
FIG. 3 is a detailed view of an alternate configuration of the reactor vessel 110 of the hydrogen production system 100 in accordance with an embodiment of the disclosed principles.

Turning now to FIG. 3, an alternate embodiment of the reactor vessel 110 is shown. The reactor vessel 110 like those disclosed in each FIG. 1 and FIG. 2 may be used within the hydrogen production system 100. The reactor vessel 110 of FIG. 3, depicts the solution 120 filling the interior of the reactor vessel 110 and the metallic or semi-metal material 130 suspended within the solution 120. Attached to the interior of the reactor vessel 110 is a funneling device 560. The funneling device 560, in an embodiment of the present disclosure, may be a mesh basket 570 attached to the interior of the reactor vessel 110. The mesh basket 570 may be made of any material that does not adversely affect the chemical reaction within the reactor vessel 110. In an embodiment of the present disclosure this material may be stainless steel. The funneling device 560 holds the metallic or semi-metal material 130, and suspends the metallic or semi-metal material 130 within the solution 120.

On the top portion of the reactor vessel 110 a feeding mechanism or actuator 390 is present. The feeding mechanism or actuator 390 as presented in FIG. 3 consists of a plurality of gate valves 580 and 590 with a holding compartment 600 located between each of the gate valves 580 and 590. Where the feeding mechanism or actuator 390 attaches to the top portion 140 of the reactor vessel 110 a feed opening 610 is present. The feeding mechanism or actuator 390 may either be fashioned into the top portion 140 of the reactor vessel 110 through the manufacture process or attached to the top portion 140 of the reactor vessel 110 through the use of feeding mechanism fasteners (not shown). Above the feed opening 610 the first gate valve 580 of the plurality of gate valves 580 and 590 is present. The first gate valve 580 acts to hold the metallic or semi-metal material 130 in place above the first gate valve 580 within the holding compartment 600. To activate the first gate valve 580, a user or a machine may pull the first handle 620 of the first gate valve 580 to remove the first pin 630 from the holding compartment 600. When the first pin 630 is removed from the holding compartment 600, the metallic or semi-metal material 130 within the holding compartment 600 falls into the interior of the reactor vessel 110. The metallic or semi-metal material 130 then follows the funneling device 560 inside of the reactor vessel 110 to arrive at the bottom of the funneling device 560.

At the top end of the holding compartment 600, a second gate valve 590 of the plurality of gate valves 580 and 590 is present. The second gate valve 590 acts as the loading mechanism to add metallic or semi-metal material 130 to the holding compartment 600. To activate the second gate valve 590, a user or a machine may pull the second handle 640 of the second gate valve 590 to remove the second pin 650 from the holding compartment 600. When the second pin 650 is removed from the holding compartment 600, the metallic or semi-metal material 130 may then be added to the holding compartment 600. Loading the holding compartment 600 in such a way provides a steady supply of metallic or semi-metal material 130 to the reactor vessel 110 allowing the chemical reaction to be maintained and adjusted based on the wishes and directives of the operator of the hydrogen production system 100. Additionally, a holding compartment purge valve 660 may be present on a side of the holding compartment 600. The holding compartment purge valve 660 may have an open and closed position operable to remove pressurized hydrogen gas from the holding compartment 600 that may have traveled up into the holding compartment 600 when the first gate valve 580 of the plurality of gate valves 580 and 590 was open.

Figure 4:
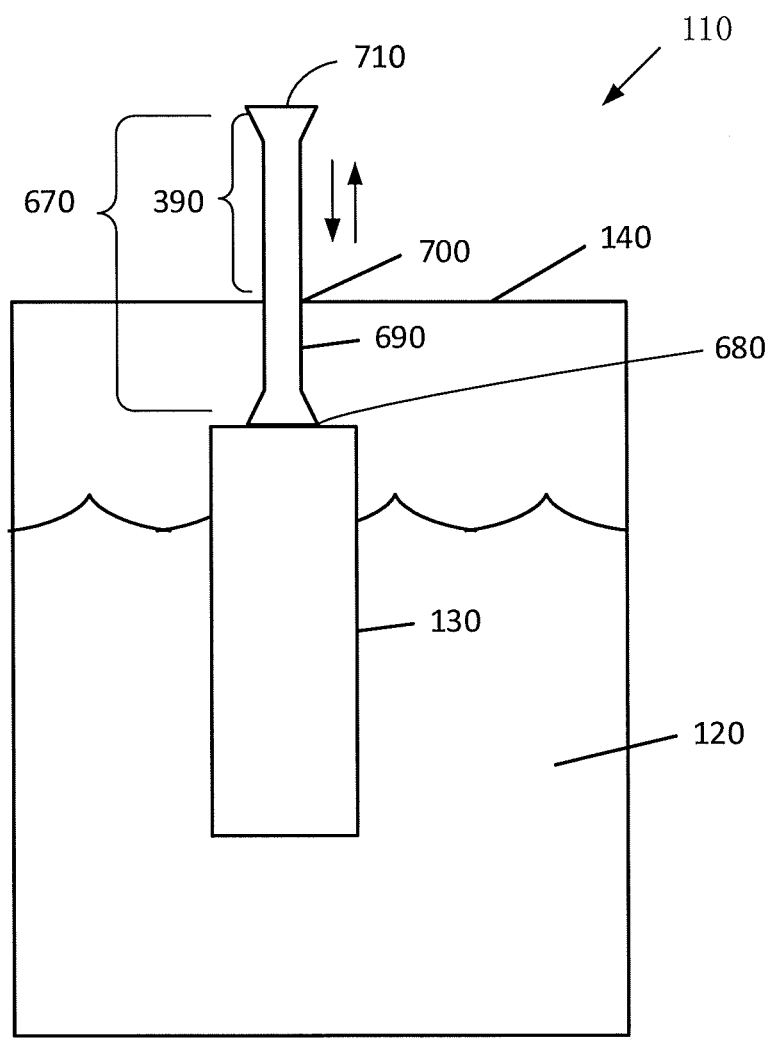
FIG. 4 is a detailed view of another alternate configuration of the reactor vessel 110 of the hydrogen production system 100 in accordance with an embodiment of the disclosed principles.

Turning now to FIG. 4, another alternate embodiment of the reactor vessel 110 is shown. The reactor vessel 110 like those disclosed in each FIG. 1, FIG. 2, and FIG. 3 may be used within the hydrogen production system 100. The reactor vessel 110 of FIG. 4, depicts the solution 120 filling the interior of the reactor vessel 110 and the metallic or semi-metal material 130 suspended within the solution 120. On the top portion 140 of the reactor vessel 110 a feeding mechanism or actuator 390 is present.

The feeding mechanism or actuator 390 as presented in FIG. 4 consists of another linear actuator represented by a plunging mechanism 670 attached to the metallic or semi-metal material 130. At the bottom of the plunging mechanism 670, a plunging attachment 680 attaches the metallic or semi-metal material 130 to the plunging mechanism 670. In this embodiment of the present disclosure the metallic or semi-metal material 130 can be fashioned in a cylindrical, square or block fashion as a large chunk of the metallic or semi-metal material 130. Attached to the plunging attachment 680 is a plunging shaft 690. The plunging shaft 690 runs through the interior of the reactor vessel 110 and through the top portion 140 of the reactor vessel 110. A plunging seal 700 is formed around the top portion 140 of the reactor vessel 110 and the plunging shaft 690. This plunging seal 700 allows for movement of the plunging shaft 690 in a vertical direction while also creating a seal that does not allow the escape of hydrogen gas from the interior of the reactor vessel 110. At the top end of the plunging shaft 690 is a plunging handle 710. The plunging handle 710 can be depressed or extended by either a user or a machine By depressing or extending the plunging handle 710 the metallic or semi-metal material 130 can be either submerged or removed from the solution 120 inside the reactor vessel 110. By adjusting the amount of metallic or semi-metal material 130 within the solution 120, the chemical reaction inside the reactor vessel 110 can be modulated.

The hydrogen production system 100 as described above relies on the chemical reaction occurring within the reactor vessel 110. Within the reactor vessel 110 a metallic or semi-metal material 130 is introduced into a solution 120. As stated above, the metallic or semi-metal material 130 used in this embodiment of the present disclosure is aluminum (Al). As for the solution 120, the solution 120 of the present disclosure is a combination of water ($H_2O$) and a caustic. In this embodiment of the present disclosure the caustic being used is sodium hydroxide (NaOH). The use of this metallic or semi-metal material 130 and caustic should not be interpreted as a limiting factor of the hydrogen production system 100. Other metallic or semi-metal materials 130 and caustics may be used, yet additional calculations and adjustment may be made to their respective ratios for production rate and yield purposes.

Figure 5:
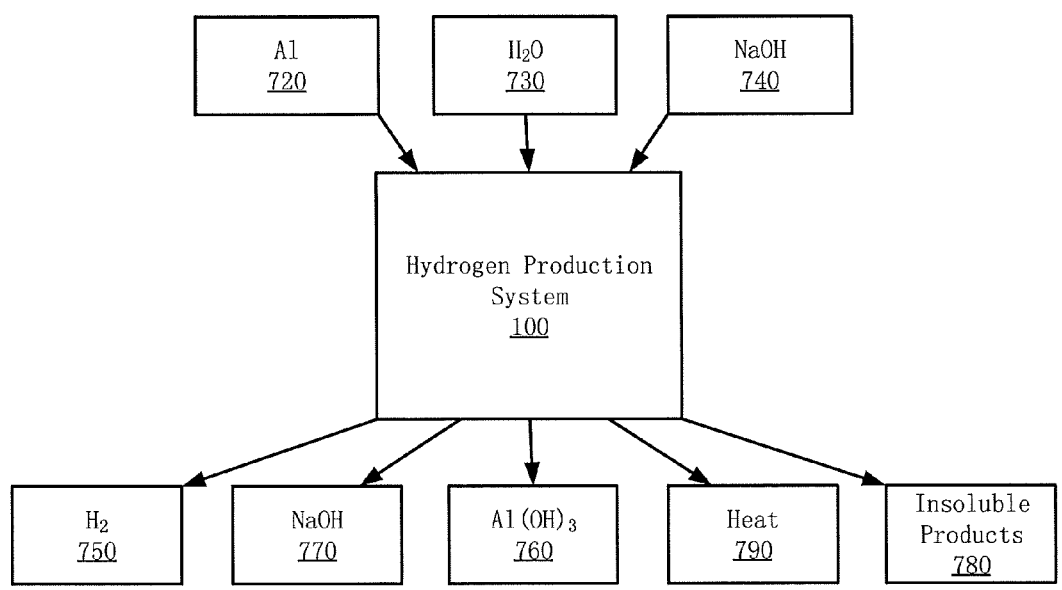
FIG. 5 is a block view of the chemical reaction produced within the reactor vessel 110 of the hydrogen production system 100 in accordance with an embodiment of the disclosed principles.

FIG. 5 provides a block view of the chemical reaction produced within the reactor vessel 110 of the hydrogen production system 100. Aluminum (Al) 720, water ($H_2O$) 730, and sodium hydroxide (NaOH) 740 can be seen as inputs to the chemical reaction within the hydrogen production system 100. The middle block of FIG. 5 represents the chemical reaction occurring through use of the hydrogen production system 100. Finally, the outputs of chemical reaction of the hydrogen production system 100 can be seen in blocks representing hydrogen ($H_2$) 750, aluminum hydroxide (Al(OH)3) 760, sodium hydroxide (NaOH) 770, insoluble products 780, and heat 790.

The stoichiometric equation representing the chemical reaction within the reactor vessel 110 may be represented by the following equation.

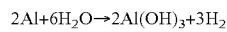

$$2Al + 6H_2O \rightarrow 2Al(OH)_3 + 3H_2$$

Within the reactor vessel 110, the aluminum (Al) reacts with the solution 120 containing water ($H_2O$) and sodium hydroxide (NaOH). After the chemical reaction occurs, the products and byproducts which result are aluminum hydroxide (Al(OH)$_3$), hydrogen (H$_2$), heat, and possible insoluble products. It can be seen from this equation that the sodium hydroxide (NaOH) is not consumed by this chemical reaction. The sodium hydroxide (NaOH) acts as a catalyst. This helps to aid the ongoing chemical reaction. The specific chemical reaction that occurs within the reactor vessel 110 involves the interaction between the water (H$_2$O) and the aluminum (Al). The aluminum (Al) reacts with the water (H$_2$O) and splits the water (H$_2$O) molecules into OH— and H$_2$. The aluminum (Al) combines with the OH— to create aluminum hydroxide (Al(OH)$_3$). The left over hydrogen (H$_2$) is then released in its gaseous state. The released hydrogen (H$_2$) from this chemical reaction is the hydrogen obtained and collected by the hydrogen production system 100.

To determine the best yield and production rates for hydrogen when using this hydrogen production system 100 significant testing and calculations were completed. This resulted in the discovery of four distinct yet interrelated variables which are used within the hydrogen production system 100 for control of the chemical reaction, production rate of hydrogen, and determination of the yield rate of hydrogen. These four variables are surface area, temperature, molarity, and solubility.

Figure 6:
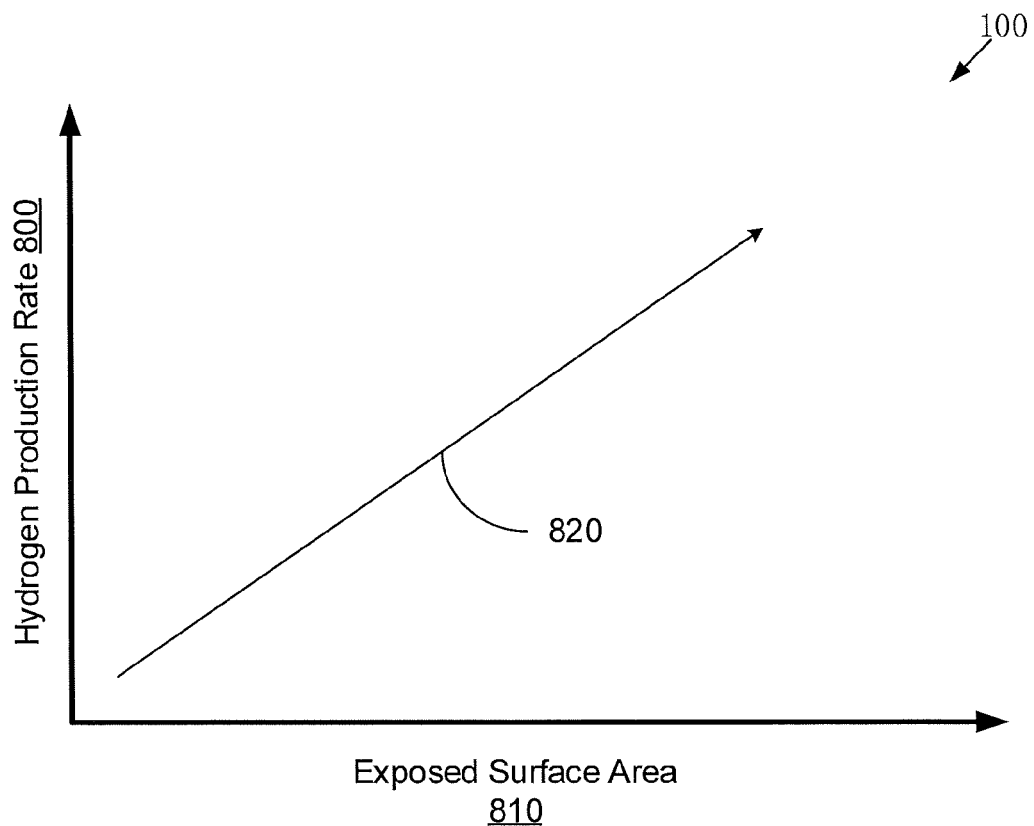
FIG. 6 is a graphical representation of a surface area variable of the chemical reaction in the hydrogen production system 100 in accordance with an embodiment of the disclosed principles.

FIG. 6 shows a graphical representation of the hydrogen production rate 800 within the hydrogen production system 100 in relation to surface area 810. Dedicated testing and experimentation determined that surface area 810 is an important control variable regarding the production rate 800 of hydrogen. It was found that the surface area 810 of the aluminum (Al) exposed to the solution 120 had a linear relationship 820 with the hydrogen production rate 800. As more surface area 810 was exposed to the solution 120, the rate of production 800 increases proportionally to the amount of surface area 810 exposed. Therefore, exposing more or less surface area 810 of aluminum (Al) to the solution 120 would either increase or decrease the production rate 800 of hydrogen gas within the hydrogen production system 100.

Figure 7:
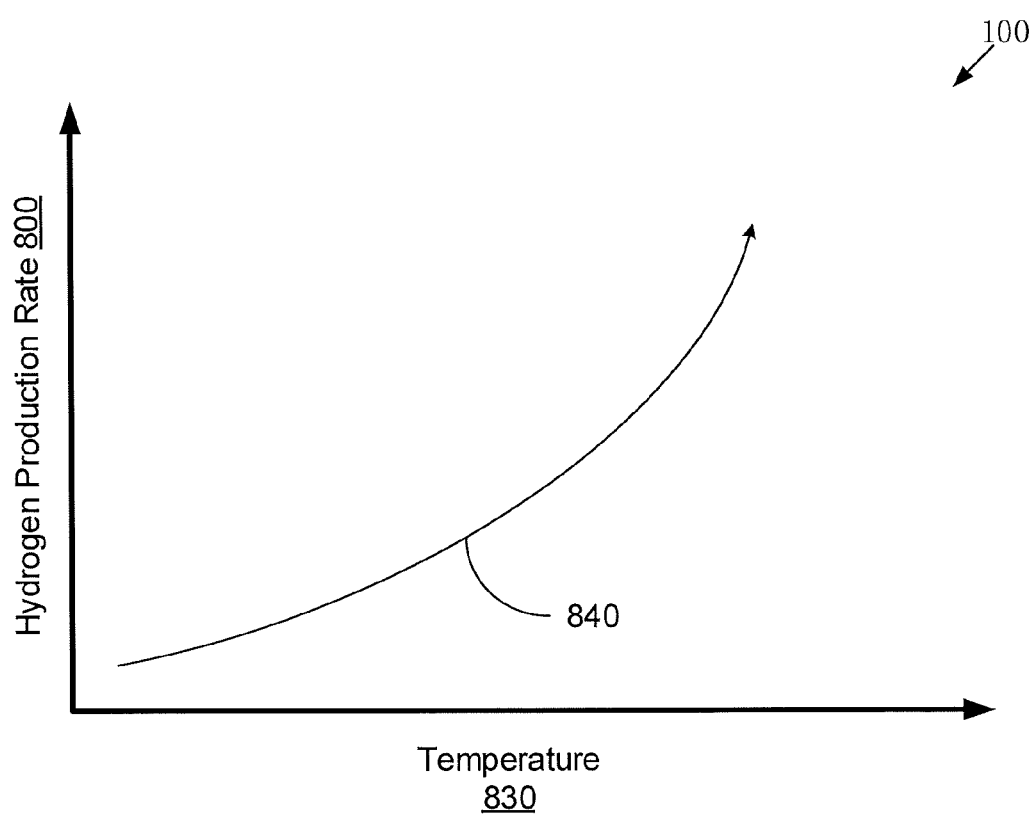
FIG. 7 is a graphical representation of a temperature variable of the chemical reaction in the hydrogen production system 100 in accordance with an embodiment of the disclosed principles.

FIG. 7 shows a graphical representation of the hydrogen production rate 800 within the hydrogen production system 100 in relation to temperature 830. Dedicated testing and experimentation determined that the temperature 830 obtained by the chemical reaction is an important control variable regarding the production rate 800 and yield of hydrogen. It was found that as the temperature 830 of the reactor vessel 110 increased, the production rate 800 of hydrogen gas increased exponentially 840. The heat of the chemical reaction is used to heat the solution 120, which in turn increases the production rate 800 of hydrogen gas. This increased production then in turn increases the temperature 830 of the solution 120. With every 10 degree Celsius rise, the production rate 800 and heat of the chemical reaction doubles. Therefore, to regulate the production of hydrogen gas using the hydrogen production system 100, the temperature 830 of the reactor vessel 110 must be closely monitored and adjusted to maintain a steady constant production rate. An unchecked chemical reaction within the reactor vessel 110 could lead to a runaway reaction that could cause catastrophic failure of the hydrogen production system 100 if not monitored or controlled. Therefore, control mechanisms such as the cooling container 470 and temperature gauge 170 have been added to the hydrogen production system 100 to safely monitor and control the production of hydrogen.

Figure 8:
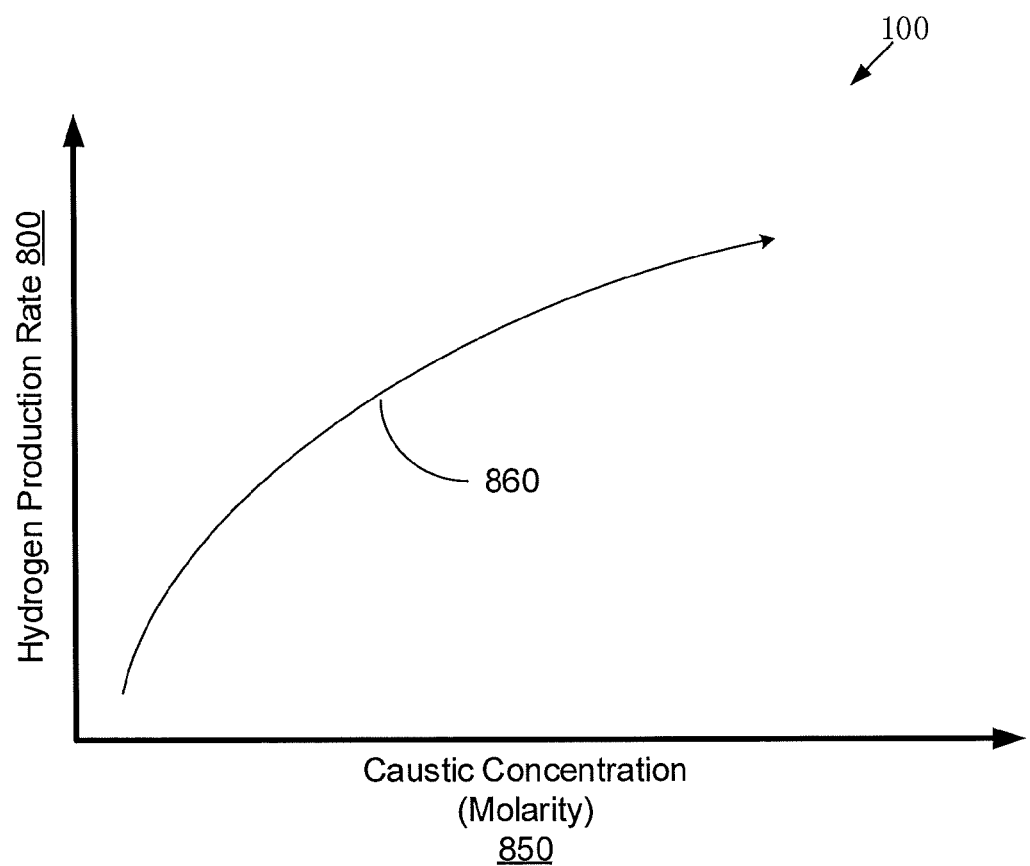
FIG. 8 is a graphical representation of a molarity variable of the chemical reaction in the hydrogen production system 100 in accordance with an embodiment of the disclosed principles.

FIG. 8 shows a graphical representation of the hydrogen production rate 800 within the hydrogen production system 100 in relation to molarity 850. Dedicated testing and experimentation determined that the molarity 850 of the sodium hydroxide (NaOH) dissolved in the water (H$_2$O) of the solution 120 is an important control variable regarding the production rate 800 and yield of hydrogen. This relationship between the production of hydrogen and the molarity concentration 850 of the sodium hydroxide (NaOH) was found to be logarithmic 860. Therefore, as the concentration of the sodium hydroxide (NaOH) is increased within the solution 120, the gain of hydrogen production rate diminishes logarithmically. Testing showed that production levels below a certain ratio were not consistent and self-sustaining. Therefore, for adequate and self-sustaining production of hydrogen using the hydrogen production system 100, the user should maintain a certain molarity concentration 850 of the solution 120. The molarity concentration 850 used should be based on the desired hydrogen production rate 800 of the user of the hydrogen production system 100.

Figure 9:
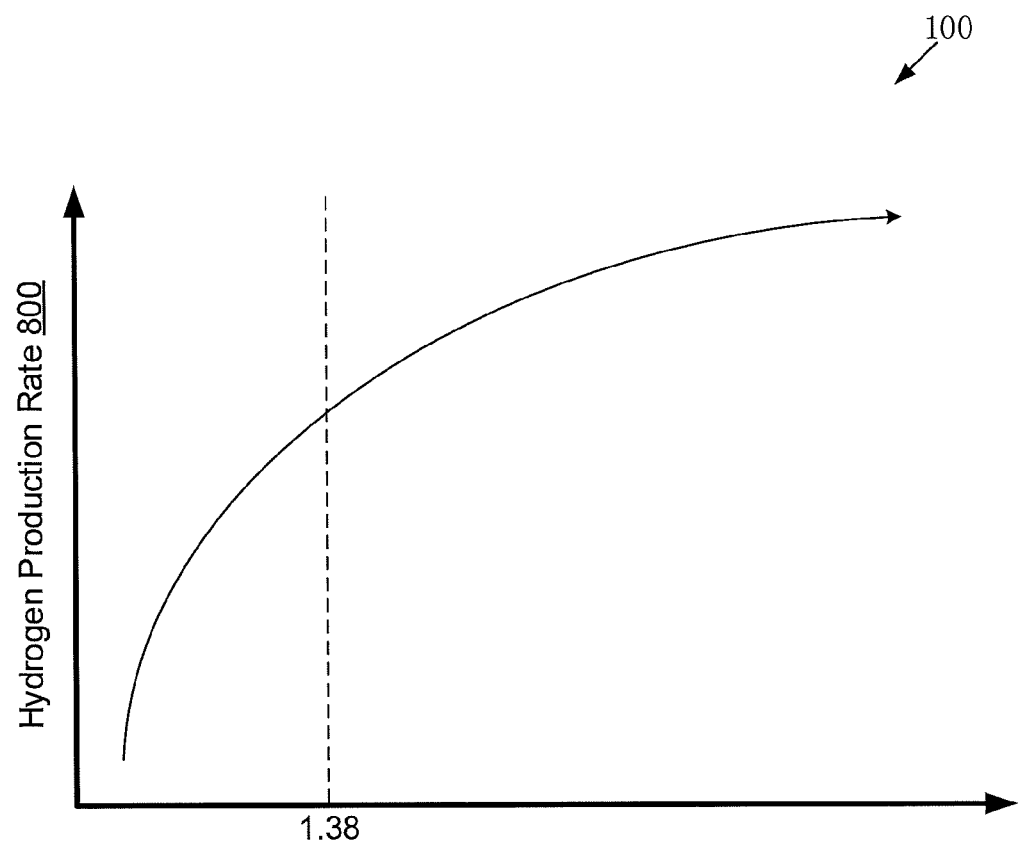
FIG. 9 is a graphical representation of a solubility variable of the chemical reaction in the hydrogen production system 100 in accordance with an embodiment of the disclosed principles.

FIG. 9 shows a graphical representation of the hydrogen production rate 800 within the hydrogen production system 100 in relation to solubility 870. Dedicated testing and experimentation determined that the solubility relationship 870 between the sodium hydroxide (NaOH) and the aluminum (Al) is an important control variable regarding the production rate 800 and yield of hydrogen. It was found that the molecular ratio of sodium hydroxide (NaOH) to aluminum (Al) within the solution 120 should be kept above 1.38. If the molecular ratio falls below 1.38, the aluminum hydroxide (Al(OH)$_3$) that is formed as a byproduct of the chemical reaction and dissolved within the solution 120 will begin to precipitate out. This precipitation out of the solution 120 would allow the aluminum hydroxide (Al(OH)$_3$) to form in various precipitates depending on the system conditions. This precipitation could cause complications to the hydrogen production system 100 such that that aluminum hydroxide (Al(OH)$_3$) may coat the aluminum (Al) preventing further chemical reactions from occurring. Additionally, the aluminum hydroxide (Al(OH)$_3$) may attach to the sides or any surface within the interior of the reactor vessel 110 or may attach to or block a portion of the solution flow path 540 such that it may interfere with the stability of the hydrogen production system 100. By keeping the molecular ratio at 1.38 or above, the complications of the aluminum hydroxide (Al(OH)$_3$) precipitating out of the solution 120 may be avoided.

FIG. 10 provides a table 880 of the above stated variables for operation of the hydrogen production system 100. Provided within FIG. 10 is a range of operation constraints 890 determined through testing and experimentation of the hydrogen production system 100. Testing found that hydrogen production occurs when the surface area 810 of the metallic or semi-metal material 130 is unbounded. As long as the metallic or semi-metal material 130 is able to react with the solution 120, hydrogen production at a hydrogen production rate 800 will occur. More favorable results for the hydrogen production rate 800, were found when the metallic or semi-metal material 130 was aluminum (Al) molded into a flat plate configuration having a thickness between 0.01 to 0.1628 inches. Additionally, testing results concluded that hydrogen production could be observed when the temperature 830 was held within the range of 10 to 200 degrees Celsius for the hydrogen production system 100. However, more favorable hydrogen production rates 800 were observed when the temperature 830 of the solution 120 within the hydrogen production system 100 was maintained between 40 to 90 degrees Celsius. Furthermore, testing and experimentation found that the molarity 850 of the solution 120 allowed for hydrogen production when the solution 120 had a molarity 850 within the range of 0.1 to 8 moles per liter. Subsequent testing concluded that better hydrogen production rates 800 were obtained when the molarity 850 range of the solution 120 was kept between 1.5 to 4 moles per liter for the solution 120 in the hydrogen production system 100. Finally, testing and experimentation concluded that hydrogen production occurred when the solubility 870 of the caustic in relation to the metallic or semi-metal material 130 within the solution 120 of the hydrogen production system 100 was kept greater than one. Further testing, found that more favorable results occurred when the solubility 870 within the solution maintained a ratio greater that 1.38 to allow the byproduct to remain within the solution 120.

Figure 11:
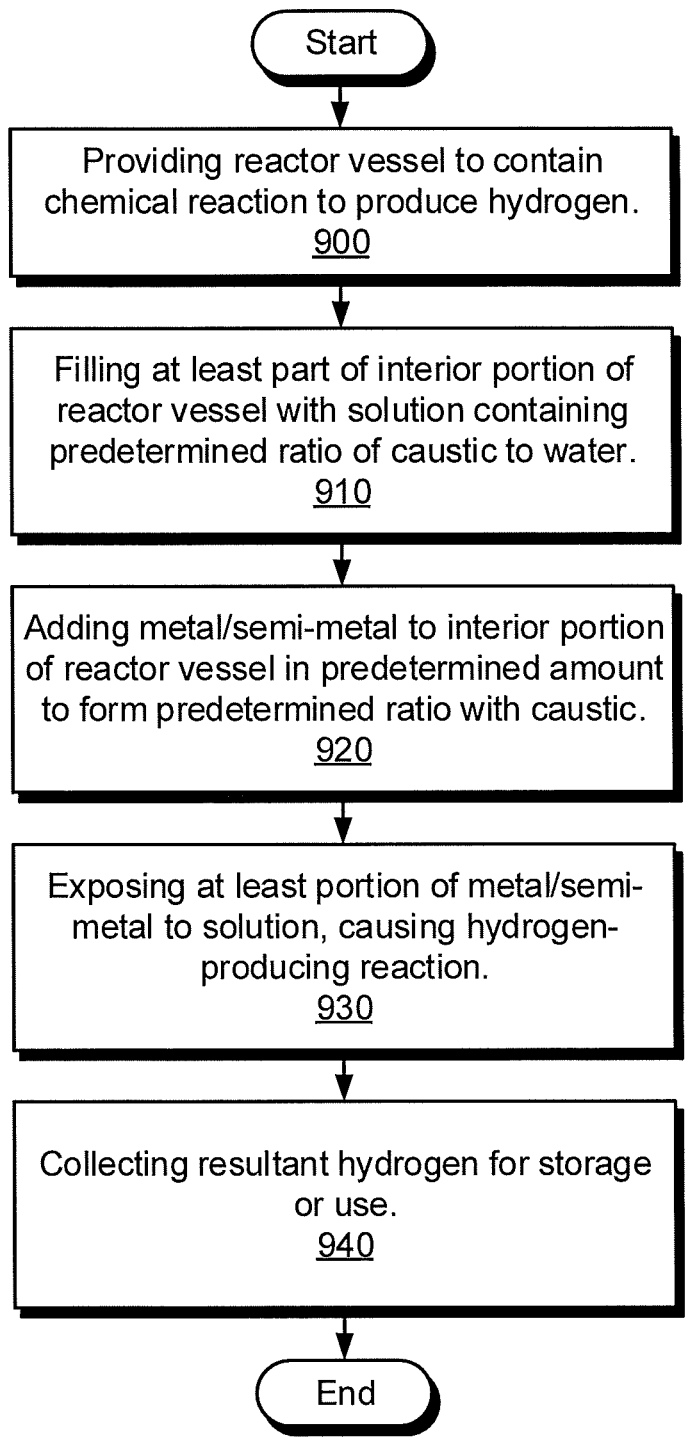
FIG. 11 is a flow chart showing a method to produce hydrogen gas using the hydrogen production system in accordance with an embodiment of the disclosed principles.

Referring now to FIG. 11, an exemplary succession of steps which are used to produce hydrogen gas from the disclosed hydrogen production system 100 is shown. In block 900, a reactor vessel 110 is provided to contain a chemical reaction to produce hydrogen. The reactor vessel 110 may be any of the embodiments as disclosed above as long as it functions to the above stated standards needed for the production of hydrogen. Next, in block 910, the interior portion of the reactor vessel 110 is filled at least in part with a solution 120. The solution 120 would contain a combination of water as well as the caustic at a predetermined ratio depending on the needs of user operating the hydrogen production system 100. This predetermined ratio affects the generation rate and yield of hydrogen gas produced by the hydrogen production system 100. In an embodiment of the present disclosure, this caustic would be sodium hydroxide (NaOH). Then in block 920, a metallic or semi-metal material 130 is added to the interior portion of the reactor vessel 110. Adding the metallic or semi-metal material 130 to the interior can be accomplished in any of the ways and methods described above. The metallic or semi-metal material 130 may be added with use of a feeding mechanism or actuator 390, may be placed on a lowering device 350, or attached to a plunging mechanism 670 for adding the metallic or semi-metal material 130 to the solution 120 inside the reactor vessel 110. In an embodiment of the present disclosure, the metallic or semi-metal material 130 used is aluminum (Al). Next, in block 930, the metallic or semi-metal material 130 is reacted with the solution 120 within the reactor vessel 110. This chemical reaction occurs when the metallic or semi-metal material 130 comes into contact with the solution 120. In the embodiments disclosed above this is commonly achieved by lowering the metallic or semi-metal material 130 into the solution 120 filling the reactor vessel 110. Additionally, in an alternate embodiment of the present disclosure the solution 120 level of the reactor vessel 110 may be modified to allow the metallic or semi-metal material 130 to contact the solution 120. Finally, in block 940, hydrogen gas is produced as a result of the chemical reaction between the solution 120 and the metallic or semi-metal material 130. In addition to the production of hydrogen gas, heat is produced as well as other byproducts of the chemical reaction. If, as the embodiments of this disclosure state, aluminum (Al) is used to react with water containing sodium hydroxide (NaOH), the byproducts resulting from the chemical reaction will be aluminum hydroxide ($Al(OH)_3$) and possible additional insoluble products.

It will be appreciated that various systems and processes for producing hydrogen gas have been disclosed herein, along with methods and configurations for producing hydrogen gas. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

INDUSTRIAL APPLICABILITY

From the foregoing, it may be appreciated that the hydrogen production system disclosed herein may have industrial applicability in a variety of settings such as, but not limited to, use in the commercial manufacture of hydrogen. Such a disclosed system of collecting gaseous hydrogen may also be used, for example in powering hydrogen based machinery such as cars, aircraft or generators, in military applications for generating power, operating vehicles, or filling airships, balloons, or commercial storage devices.

Additionally in the field of hydrogen collection, such a hydrogen production system involves materials and containment which can be easily transported from location to location with great ease and for multiple uses. Furthermore, the materials used in such hydrogen production system do not react chemically with each other and are stable when transported and not in combination to produce the hydrogen. The disclosed hydrogen production system may be assembled for both small and large scale production situations. The hydrogen production system provides a cost effect production platform which can be produced on demand in any environment or situation based on the needs of the user.

Moreover, use of the disclosed hydrogen production system produces a high quality of hydrogen gas. Produced hydrogen using the disclosed system has been tested and evaluated up to and exceeding a 99.8% purity level. Furthermore, the disclosed hydrogen production has the additional benefits of being able to operate at low pressures and low temperatures. This in turn increases the overall safety of the disclose hydrogen production system.

While the foregoing detailed description has addressed only specific embodiments, it is to be understood that the scope of the disclosure is not intended to be limiting. Thus, the breadth and spirit of this disclosure is intended to be broader than any of the embodiments specifically disclosed and/or encompassed within the claims appended hereto.

What is claimed is:

1. A hydrogen production system comprising:
   a reactor vessel having an interior chamber;
   a hydrogen extraction point on the reactor vessel in fluid communication with the interior chamber;
   an actuator that alters a surface area of the metallic body exposed to the solution to alter a rate of production of hydrogen gas by introducing the metallic or semi-metal material into a funneling device with a perforated submerged portion, the perforated submerged portion being configured to prevent unreacted portions of the metallic or semi-metal material from exiting the funneling device;
   a solution filling at least a portion of the interior chamber, the solution containing at least a predetermined amount of a caustic in water such that the predetermined amount of the caustic dissolves within the water; and
   a metallic or semi-metal material consisting essentially of a predetermined amount of metallic or semi-metal material, the metallic or semi-metal material being at least partially within the interior chamber in contact with the solution, such that a surface of the predetermined amount of metallic or semi-metal material is exposed to the solution, producing hydrogen gas.

2. The hydrogen production system in accordance with claim 1, wherein the caustic includes sodium hydroxide (NaOH).

3. The hydrogen production system in accordance with claim 1, wherein the metallic or semi-metal material includes aluminum (Al).

4. The hydrogen production system in accordance with claim 1, further comprising a reservoir tank located remotely from the reactor vessel, the reservoir tank being connected to the reactor vessel by a fluid passage adapted to provide the solution into the reactor vessel.

5. The hydrogen production system in accordance with claim 4, further comprising a containment vessel and a hydrogen flow path between the hydrogen extraction point and the containment vessel, the hydrogen flow path having at least one purge valve configured to remove a gas from the hydrogen production system when open.

6. The hydrogen production system in accordance with claim 5, wherein the hydrogen flow path includes or connects to a desiccator configured to remove water vapor from hydrogen gas flowing through the hydrogen flow path.

7. The hydrogen production system in accordance with claim 1, wherein a ratio of the caustic to the metallic or semi-metal material is selected to allow the entirety of the metallic or semi-metal material body to be consumed in the production of hydrogen gas without precipitation of a byproduct into the solution.

8. The hydrogen production system in accordance with claim 1, wherein a molarity of the caustic within the solution is selected to increase a hydrogen production rate of the hydrogen production system.

9. The hydrogen production system in accordance with claim 1, wherein the actuator includes a linear actuator configured to alter the amount of the metallic body exposed to the solution.

10. The hydrogen production system in accordance with claim 9, wherein the linear actuator passes through a seal on a top portion of the reactor vessel and is configured to hold the metallic or semi-metal material within the interior of the reactor vessel and to select an extent to which the metallic or semi-metal material is submerged in the solution.

11. The hydrogen production system in accordance with claim 1, wherein the actuator includes a feeding clip configured to periodically or continuously introduce portions of the metal body into the solution.

12. The hydrogen production system in accordance with claim 1, further including a cooling container into which the reactor vessel is placed, the cooling container containing a cooling agent for removing reaction heat from the reactor vessel.

* * * * *